J. A. DE VITO.
APPARATUS FOR RAISING SUNKEN VESSELS.
APPLICATION FILED JAN. 12, 1920. RENEWED DEC. 7, 1921.
1,415,533.
Patented May 9, 1922.
6 SHEETS—SHEET 1.
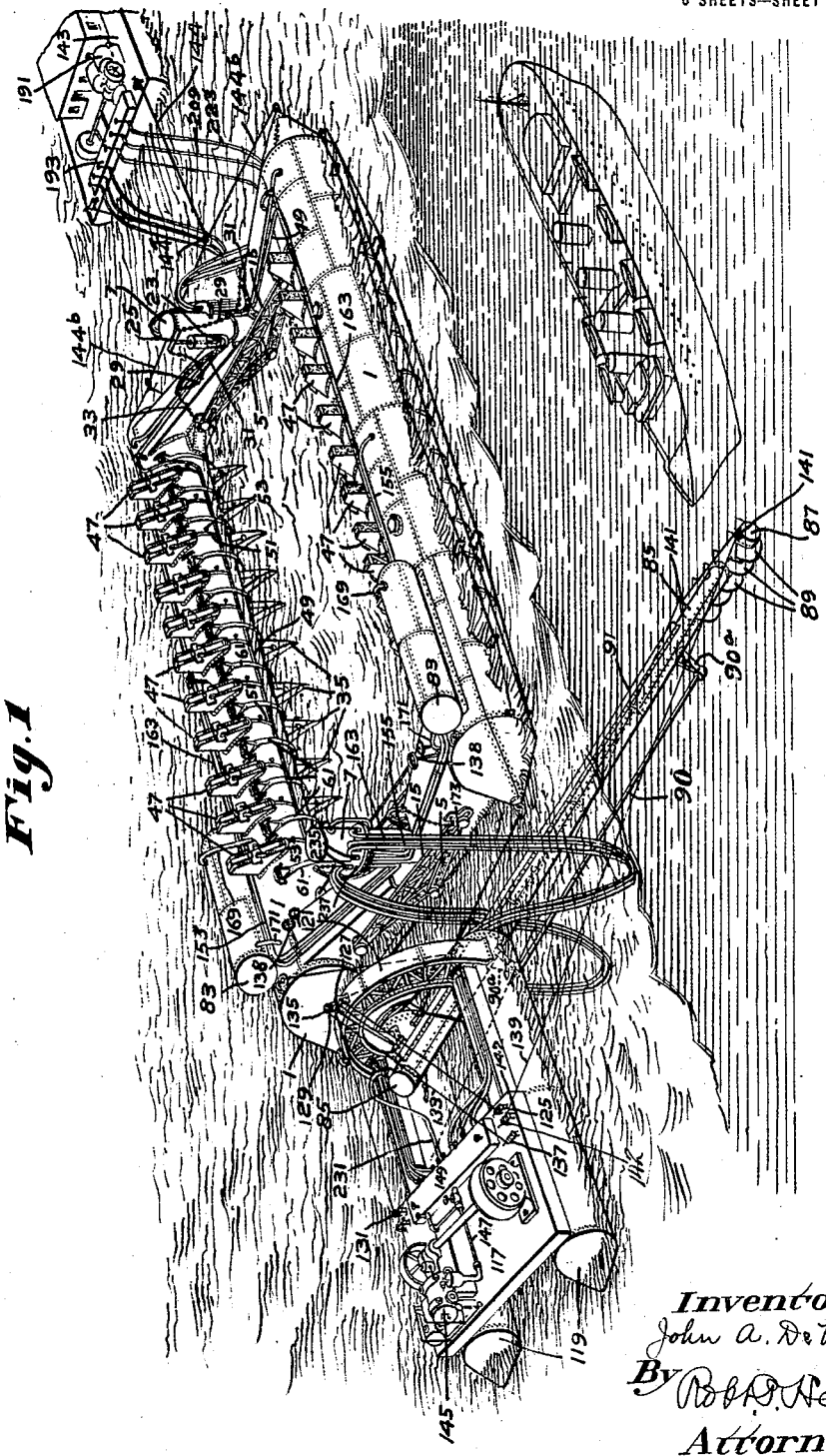
Inventor:
John A. De Vito
By Rob D. Harris.
Attorney J. A. DE VITO.
APPARATUS FOR RAISING SUNKEN VESSELS.
APPLICATION FILED JAN. 12, 1920. RENEWED DEC. 7, 1921.
1,415,533.
Patented May 9, 1922.
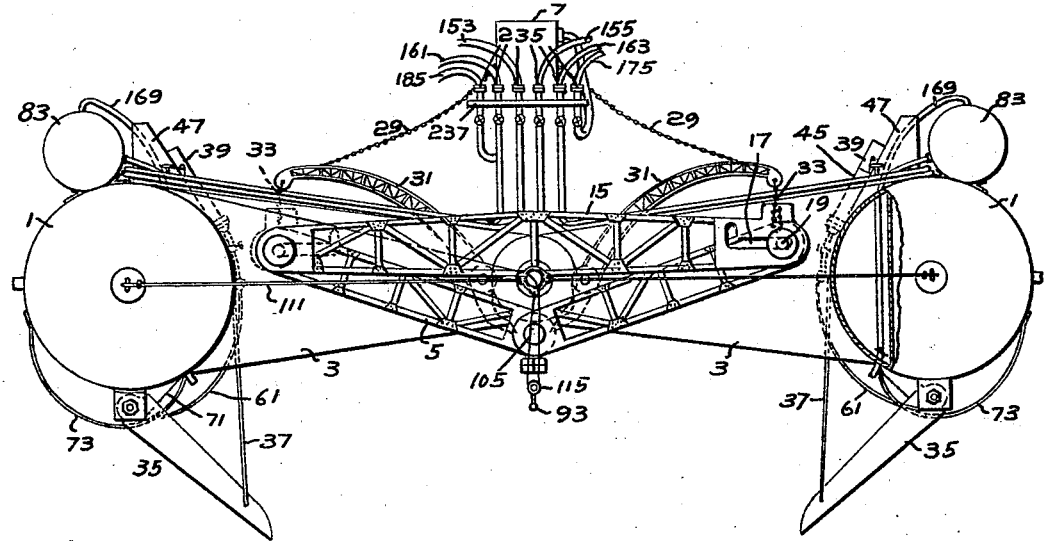
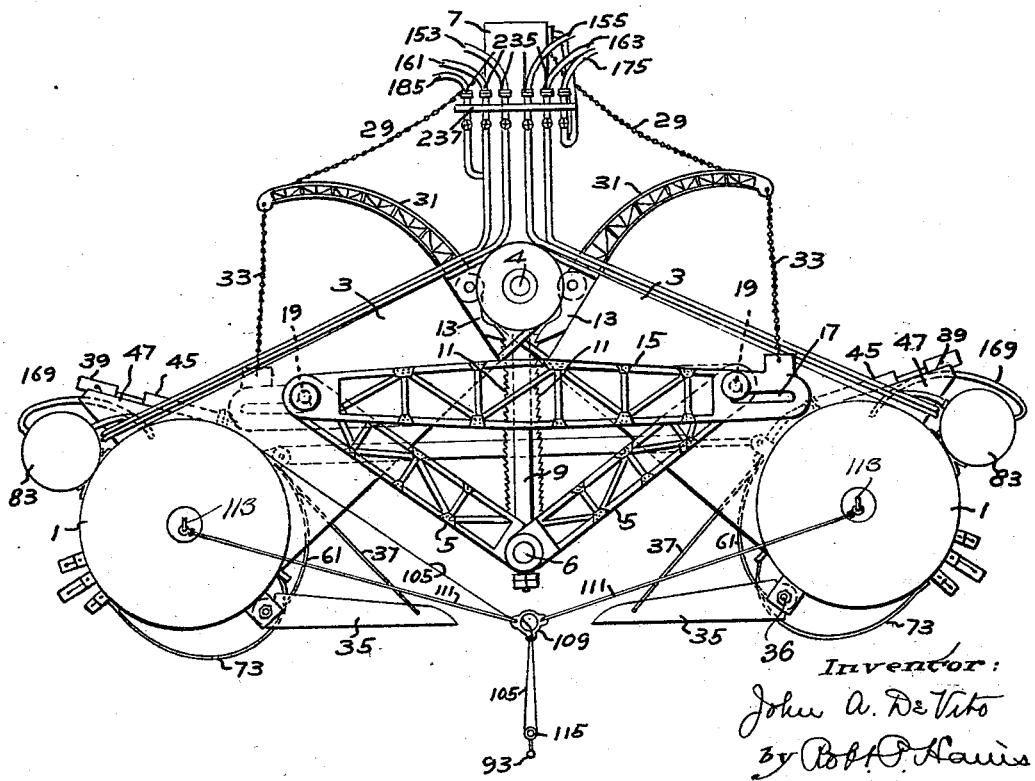
Inventor:
John A. DeVito
by Robt. P. Lewis
Attorney

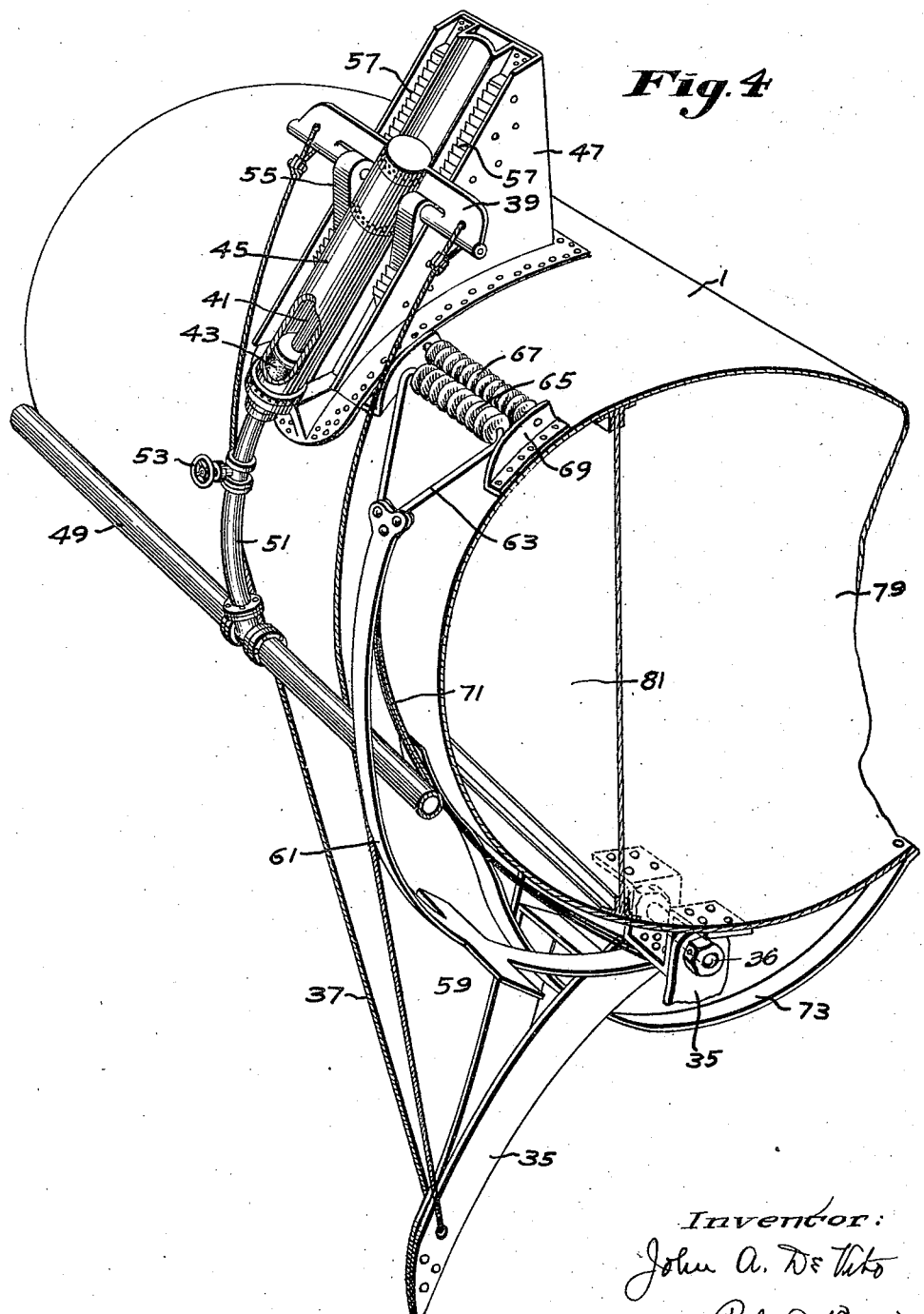

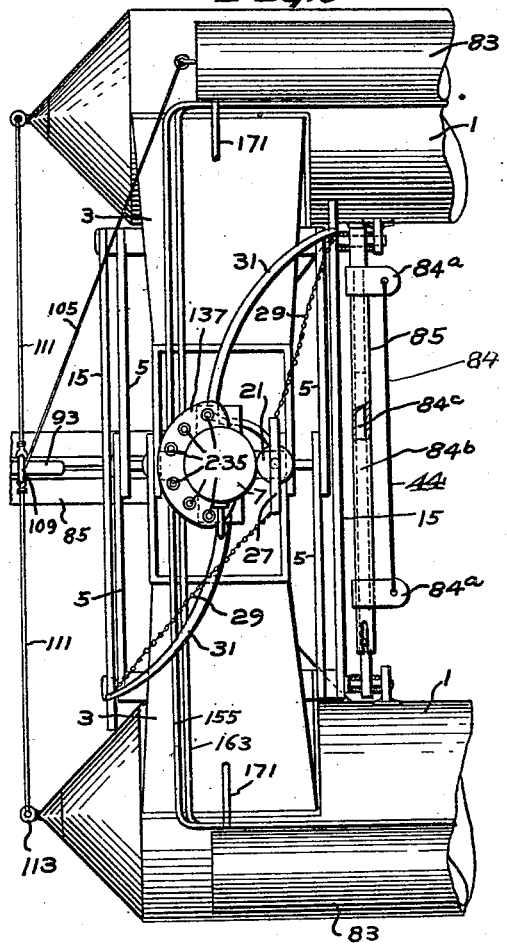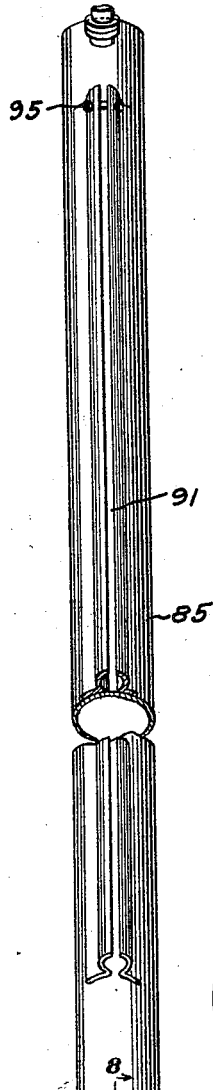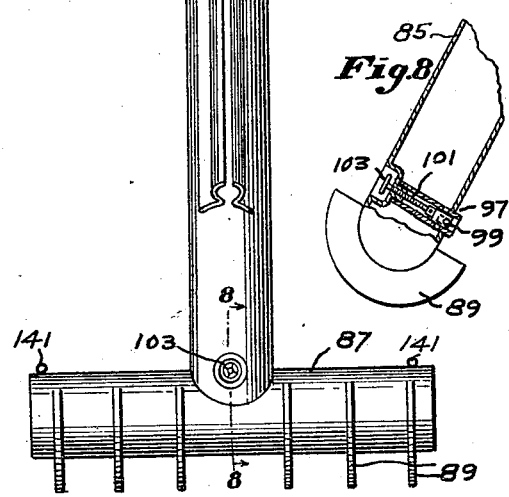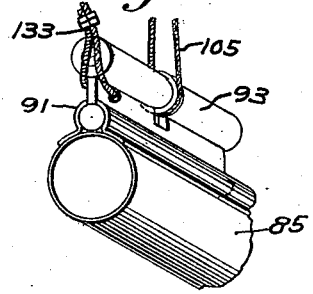

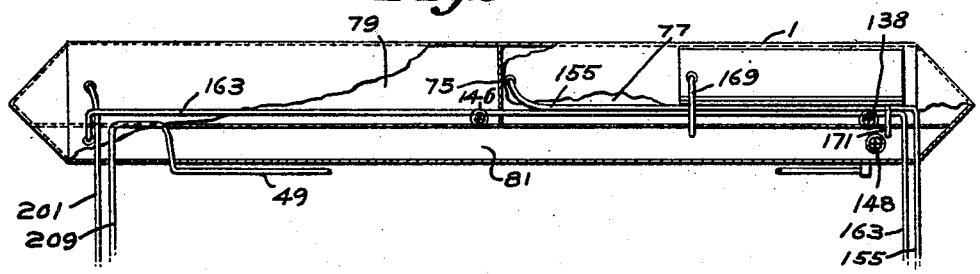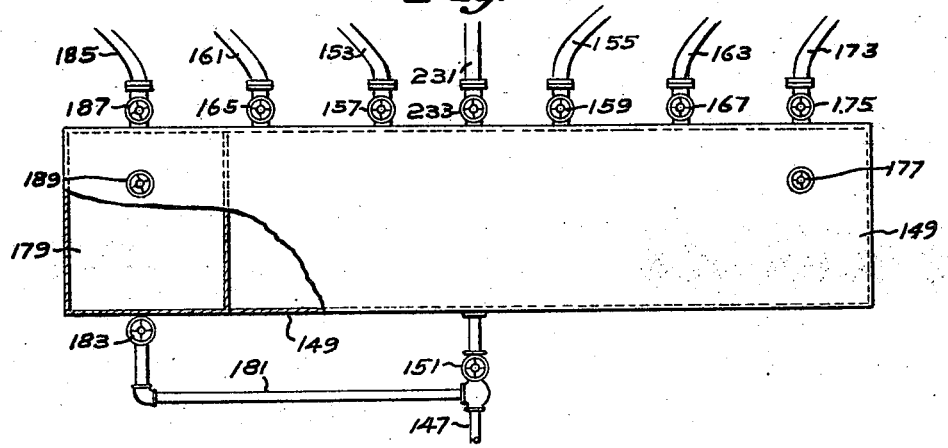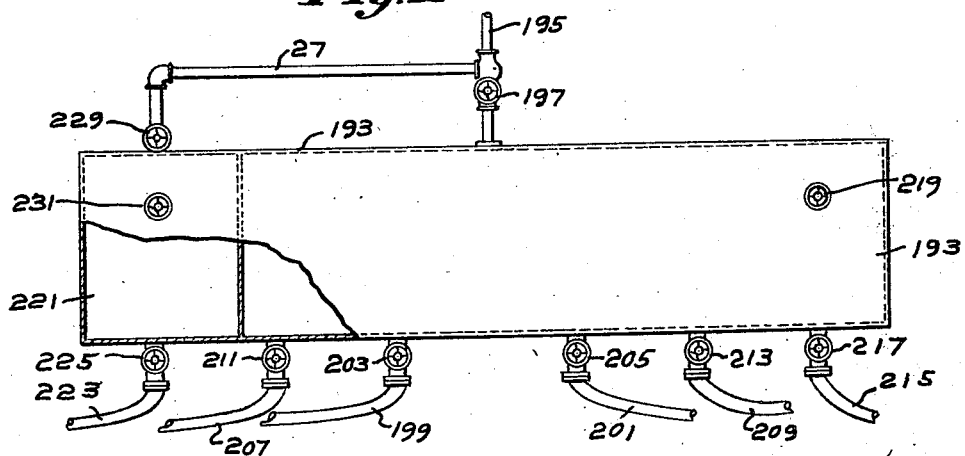

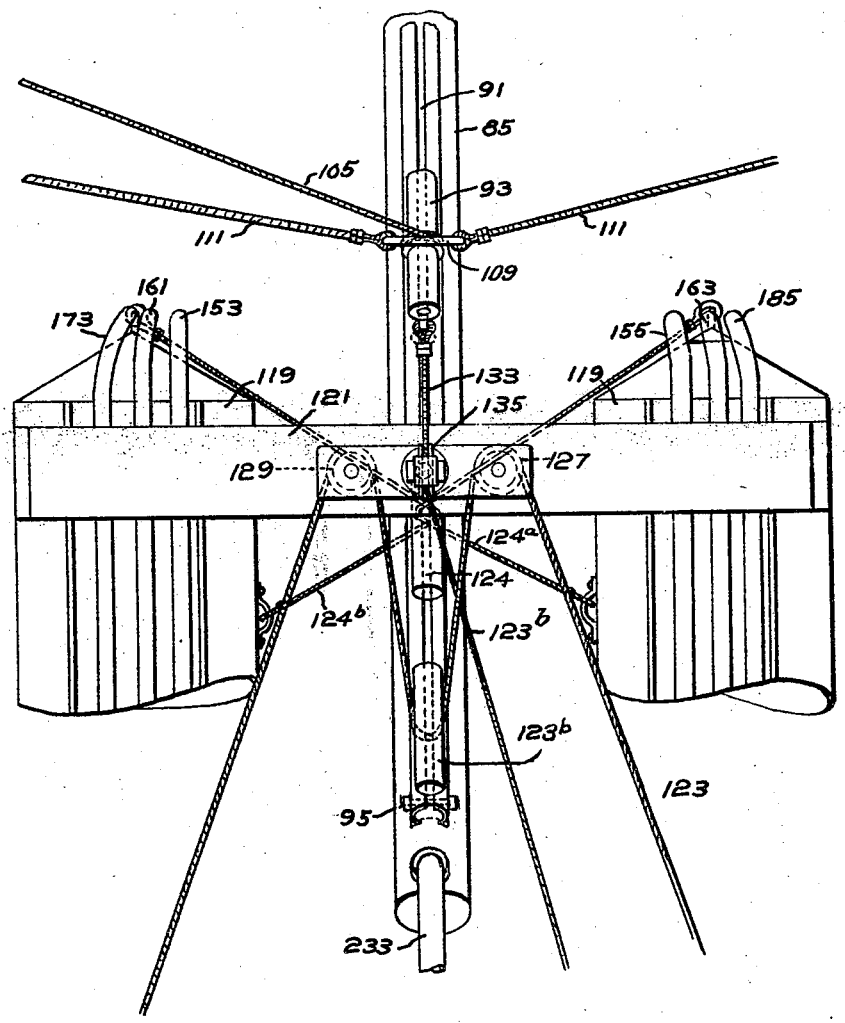

UNITED STATES PATENT OFFICE.

JOHN A. DE VITO, OF MEDFORD, MASSACHUSETTS.

APPARATUS FOR RAISING SUNKEN VESSELS.

1,415,533. Specification of Letters Patent. Patented May 9, 1922.

Application filed January 12, 1920, Serial No. 350,757. Renewed December 7, 1921. Serial No. 520,720.

*To all whom it may concern:*

Be it known that I, JOHN A. DE VITO, a citizen of the United States, residing at Medford, in the county of Middlesex and State of Massachusetts, have invented an Improvement in Apparatus for Raising Sunken Vessels, of which the following description, in connection with the accompanying drawings, is a specification, like characters on the drawings representing like parts.

The invention hereinafter described relates to apparatus for raising sunken vessels and other bodies.

Heretofore, for this purpose, pontoons have been lowered to the sunken vessel and connected thereto, and then the water has been forced from the pontoons to raise them with the vessel to the surface of the water. This has been found to be a slow, difficult and expensive operation of limited usefulness. It has been very difficult to direct the pontoons to the sunken vessel and to apply them to the opposite sides of the hull thereof, and after the pontoons have been so positioned, it has been necessary for a diver to secure the pontoons to the vessel. This is usually accomplished by passing chains from one pontoon beneath the vessel to the pontoon at the opposite side thereof. Moreover, this is not always possible, for the reason that frequently the hull of the vessel rests upon soft material, such, for example, as sand or mud, and becomes imbedded therein to such an extent that it is impossible to place the chains beneath the vessel.

The present invention, among other objects, provides means which may be readily directed from the surface of the water to the sunken vessel, and be applied thereto in readiness to raise the same regardless of whether the vessel rests on rock, sand, mud or other character of bottom. It is unnecessary for a diver to attach the apparatus to the vessel, since this may be accomplished by means controlled above the surface of the water.

In apparatus formerly used, after the pontoons have been attached to the vessel in readiness to raise the same, difficulty has been experienced in bringing the vessel to the surface without capsizing the apparatus and releasing the vessel therefrom. This is frequently caused by the shifting of the load in the vessel and displacing the center of gravity thereof, so that the vessel will tend to list heavily to one side. Another object of the invention is to provide an apparatus which may be easily and readily controlled to compensate for the shifting of the load, and produce a distributed lifting effect as required. The construction of the apparatus of the present invention is such that the apparatus may not only be applied to the sunken vessel under control above the surface of water, but also the apparatus may be controlled from above the surface of the water throughout its movement from the bottom of the surface.

A preferred embodiment of the present invention comprises a pair of connected pontoons movable as a unit to positions at opposite sides of the hull of a sunken vessel, and having means for moving the pontoons toward each other and the vessel between them.

One of the objects of the present invention is to provide the pontoons with series of jaws or arms movable into engagement with the hull of the sunken vessel, and with means for adjusting the jaws or arms differentially and for securing them in the adjusted position.

Another object of the invention is to provide fluid operated means for moving the pontoons toward each other, and to provide means for automatically locking the pontoons against relative movement after they have been adjusted toward each other.

Another object of the invention is to provide fluid operated means for releasing the automatic locking means.

It is desirable to lower the pontoons toward the vessel on the ocean bottom in an oblique path, because as soon as one end of the pontoons contacts with the ocean bottom it gives stability to the entire apparatus. To accomplish this the pontoons may be divided longitudinally into separate compartments and the water is admitted first to the compartments at one end of the pontoons to cause this end to move downward toward the sunken vessel, and then water is admitted to the compartments at the other end of the pontoons to cause this end to move downwardly into position in which the pontoons lie on opposite sides of the sunken vessel. Then the pontoons are moved toward one another and the series of jaws or arms are moved into supporting engagement with the hull of the vessel. The apparatus and vessel may then be raised to the surface by forcing the water from the pontoons, and the apparatus preferably is raised in an oblique path by forcing the air first from the compartments at one end of the pontoons and then from the compartments at the other end.

The jaws of the pontoons are so mounted thereon that when the apparatus is moved down to the ocean bottom, the jaws will rest on the bottom. It is desirable to relieve the jaws from the weight of the apparatus somewhat, so as to prevent the jaws from being thrust too far into the bottom, and this applies especially where the apparatus rests on a bottom of soft character. Another purpose of the invention, therefore, is the provision of longitudinal compartments in the pontoons which may have the water pumped therefrom to lighten the apparatus somewhat and prevent too deep penetration of the jaws into the ocean bottom. These lightening compartments may also be constructed and arranged to assist rocking of the pontoons toward each other when the water is forced from said compartments.

Another purpose of the invention is to provide drums or compartments at one end of the apparatus, in the present instance, the fore end, which will be located well up above the center of gravity of the apparatus, so that when water is forced from said drums or compartments, they will contribute to the lateral stability of the apparatus.

As stated, preferably the apparatus is moved from the surface of the water obliquely down toward the sunken vessel, and preferably the fore end of the apparatus is lowered before the aft end thereof. Another purpose of the invention is to provide means for guiding the fore end of the apparatus or the first end lowered in its transit down toward the sunken vessel, thereby enabling the apparatus to be more readily controlled and directed to the sunken vessel.

Another purpose of the invention is to provide pneumatic control devices on rafts or the ships attending the apparatus with provision for easily and readily controlling the various pneumatic instrumentalities of the apparatus.

With the aforesaid and other objects in view, the character of the invention will be best understood by reference to the following description of one good form thereof shown in the accompanying drawings, wherein:

Fig. 1 is a perspective view of an apparatus for raising sunken vessels embodying the invention, together with attending rafts therefor, and showing the apparatus in its position on the surface of the water in readiness to be guided down to a sunken vessel;

Fig. 2 is an end elevation of the apparatus showing the pontoons in open position in readiness to move down to the sunken vessel;

Fig. 3 is a view similar to Fig. 2, showing the pontoons and jaws moved toward one another or in closed position in readiness to support the sunken vessel;

Fig. 4 on an enlarged scale is a perspective view of a portion of one of the pontoons, and showing one of the jaws, operating means therefor, and one of the buffers and one of the skids for protecting the pontoon;

Fig. 5 is a plan of one end portion of the apparatus;

Fig. 6 on an enlarged scale is an elevation of the column for guiding the apparatus in its transit from the surface of the water toward the sunken vessel;

Fig. 7 is a perspective view of a portion of the guide column and the slide co-operating therewith;

Fig. 8 is a sectional detail taken on line 8—8 of Fig. 6;

Fig. 9 is a view of one of the pontoons with portions of the shell thereof broken away to disclose the compartments of the pontoon;

Fig. 10 is a plan of the pneumatic control box for the fore end of the apparatus;

Fig. 11 is a plan of the pneumatic control box for the aft end of the apparatus, and Fig. 12 is a plan of the guide column and a portion of the supporting raft therefor.

Referring to the drawings, the apparatus for raising sunken vessels shown therein as one good form of the invention, comprises a pair of pontoons 1 having connections preferably adjacent the ends thereof, whereby the pontoons may be adjusted outward with a sufficient space between them to enable the pontoons to be moved downward to opposite sides of a sunken vessel, and whereby the pontoons may be moved toward the hull of the sunken vessel in position to support the same. These connections, in the present instance of the invention, comprise at each end of the apparatus, a pair of arms 3 having their outer ends rigidly connected to the pontoons, and their inner ends pivotally connected at 4. A pair of links 5 may be pivotally connected to the arms 3 adjacent the outer ends thereof, and the inner ends of said links may be pivotally connected at 6. The construction is such that when the links are straightened or moved to an approximate straightened condition, the pontoons may be moved away from one another, as will be noted in Fig. 2, and when the links are buckled, the pontoons may be moved toward each other, as will be noted in Fig. 3.

Suitable means may be provided for straightening and buckling the links as described. This means, in the present instance, comprises a cylinder 7 at each end of the apparatus conveniently mounted on the arms 3 at or adjacent to their point of pivotal connection. Within the cylinder is a piston having a rod 9 projecting through the lower end of the cylinder and pivotally connected to the links 5 at the point of their pivotal connection. The construction is such that when compressed air or other fluid is introduced into the cylinders, it will force the pistons and rods downward, thereby buckling the links and moving the pontoons toward each other.

Suitable means may be provided for automatically preventing outward movement of the pontoons after they have been moved toward each other as described. To accomplish this, in the present instance, the piston rods 9 may be provided with racks 11 at opposite sides thereof adapted to be engaged by dogs 13, the construction being such that the dogs will automatically engage the teeth of the racks and prevent outward movement of the pistons in their cylinders after the pontoons have been moved to their closed positions. The weight of the apparatus tends to move the pontoons outward and maintain the dogs in efficient locking engagement with their racks, and this is further assisted by maintaining the compression in the pontoon closing cylinders 7.

In rough weather or under certain conditions, there may be a tendency for the pontoons to move further toward each other, and therefore, it is desirable to provide further locking means for the pontoons which will hold the same against both inward and outward movement. This means, in the present instance of the invention, comprises locking bridges 15 at the opposite ends of the apparatus, in the present form of the invention, a pair of such bridges being shown at each end of the apparatus. Each of these bridges may be pivotally connected to one of the arms 3 and may have a locking device conveniently in the form of a bayonet slot 17 at the opposite end thereof adapted to receive a pin 19 on the arm opposite to the arm on which the locking bridge is pivotally mounted. The construction is such that when the pontoons are in open position, the pins will stand in positions at or adjacent to the outer ends of said slots, but when the pontoons are closed, the pins will move inward along said slots to the locking ends of the latter, whereupon the locking bridges may drop down by gravity and co-operate with the pins to securely lock the pontoons in closed position.

As stated, one of the purposes of the invention is to provide means for releasing the mechanism that locks the pontoons in their position of adjustment toward each other. This means, in the present instance, comprises cylinders 21 (Figs. 1 and 5) conveniently mounted adjacent the pontoon rocking cylinders, and provided with pistons 23 having piston rods 25 projecting upward therefrom and surmounted by cross bars 27 connected by chains 29 or other suitable connections with swinging arms 31. The arms 31 may be formed integral with the dogs 13 or may be otherwise connected thereto so that the weight of the arms will serve to swing the dogs into the rack engaging position. Chains 33 have upper ends connected to the arms 31, and lower ends connected to the free ends of the locking bridges 15. The construction is such that when the pistons 23 are moved upward by compressed air or fluid pressure applied to the cylinders, as more fully hereinafter described, the chains 29 will rock the arms 31 and the dogs 13 away from the racks 11, in a direction to move the connected chains 33 to rock the locking bridges upwardly to allow the pins 19 to escape from the locking portions of the slots 17. The weight of the apparatus will then cause the arms 3 to rock downward and move the pistons from their closed position shown in Fig. 3 to their open position shown in Fig. 2.

Each of the pontoons may be provided with a series of jaws or members 35 pivotally connected to the under sides of the pontoons at 36. When the pontoons are rocked from their open to their closed positions, these jaws will be caused to approach the hull of the sunken vessel. As stated, one of the purposes of the invention is to provide means for differentially adjusting the jaws toward the hull of the vessel in order that they may conform to the contour thereof, and that all of the jaws or substantially all of the jaws may share in the support thereof. This means, in the present instance of the invention, comprises cables 37 connected to the jaws adjacent the free ends thereof and projecting upward transversely of the pontoons to yokes 39 mounted on piston rods 41 connected to pistons 43 mounted in cylinders 45 supported by chairs 47 mounted on the pontoons at intervals corresponding to the positions of the jaws. Compressed air or other fluid may be conducted to these pistons by main pipes 49 and branch pipes 51 located at the inner sides of the pontoons, the branch pipes being provided with valves 53 whereby the supply of air to any of the cylinders 45 may be shut off if desired.

When compressed air is introduced through said pipes to the cylinders 45, the pistons 43 will be forced upward and the yokes 39 operating through the cables 37 will rock the jaws 35 inward toward the hull of the vessel until the jaws are arrested by engagement therewith. The construction is such that the force acting upon the different jaws to position them is substantially the same and the jaws adjacent the bow and stern of the sunken vessel may move in further than the jaws engaging the hull intermediate the bow and stern, or in other words, the jaws may be moved in differentially a greater or less amount and automatically conform to the contour of the hull of the vessel.

Suitable means may be provided for holding the jaws in their inward positions of adjustment, this means, in the present instance, comprising dogs 55 pivotally mounted on the yokes 39 and adapted to engage racks 57 mounted on the chairs 47. As the yokes 39 are moved upward along the inclined faces of the chairs, the dogs will wipe along the racks 57 until further movement thereof is arrested by engagement of the jaws with the hull of the vessel. Then the dogs will interlock with the racks and prevent outward movement of the jaws.

It is desirable to provide means for limiting the inward or upward movement of the jaws 35 in order that they may not be drawn up to positions where they will not come up beneath and furnish support for the hull of the vessel. This means, in the present instance, comprises transverse members or stops 59 mounted on buffers 61 having their lower ends connected to brackets at the under sides of the pontoons, and their upper ends provided with bails 63 having rope-served ends 65 adapted to engage rope-served ends 67 on bails 69 secured to the pontoons. The buffers 61 may be curved or arched inward a substantial distance from the sides of the pontoons, and to contribute to holding the buffers in arched condition, cables 71 may extend between and be connected to the ends of said buffers.

The construction is such that when the jaws 35 are moved upward, they will engage the stops 59, and further upward movement of the jaws will be limited thereby. The buffers 61 project outward from the sides of the pontoons, and may protect the pontoons from injury from contact with the hull of the sunken vessel.

To further protect the pontoons and particularly the portions thereof which otherwise would rest on the bottom of the ocean when the jaws have been moved up into engagement with the hull of the sunken vessel, the pontoons may be provided with skids or feet 73 which may have ends secured to the pontoons, and may curve outwardly intermediate said ends a substantial distance from the pontoons, as will be noted in Figs. 2, 3 and 4.

As stated, the pontoons are divided into compartments so that water may be admitted to the fore ends of the pontoons to lower the apparatus obliquely to the sunken vessel, and then to the aft end of the apparatus to lower said end to the sunken vessel. After the apparatus has been operated to take hold of the hull of the sunken vessel, the water may be forced first from the aft end of the apparatus to cause the same to rise upwardly, and then the water may be forced from the fore end of the apparatus to cause the same to rise upwardly. In the present instance, each pontoon may be divided by a wall 75 (Fig. 9) into a fore compartment 77 and an aft compartment 79, and compressed air may be admitted to said compartments by means to be described.

The invention also contemplates that the pontoons shall be provided with compartments which may have water forced therefrom prior to forcing of the water from the fore and aft compartments referred to, in order to reduce the weight on the jaws and facilitate their movement toward the hull of the sunken vessel, and also in order that the inner sides of the pontoons may be lightened so as to throw the center of gravity of the pontoons outward and assist in the rocking of the pontoons toward the hull of the sunken vessel. To accomplish this, in the present instance, each of the pontoons may be provided with a compartment 81 at the inner side thereof and preferably extending the length of the pontoon. Compressed air may be admitted to these compartments 81 by means to be described.

Suitable means may be provided to prevent a vessel supported in the apparatus from striking the locking bridges or devices at the ends of the apparatus, this means in the present instance, comprising buffer cables 84 (Fig. 5) connected to brackets 84$^a$ mounted on tubes 84$^b$ pivotally connected to one of the pontoons and telescoping with tubes 84$^c$ pivotally connected to the other pontoon.

As stated, the fore end of the apparatus is adapted to move upward after the aft end of the apparatus in raising the sunken vessel to the surface of the water. One of the purposes of the invention is to provide drums or compartments 83 at the fore end of the apparatus which are located well up above the center of gravity of the apparatus. These drums communicate with the lightening compartments 81, and are adapted to be filled with water in sinking the apparatus, but before the fore end of the apparatus is raised, the water is forced from these drums or compartments and will contribute to the transverse stability. The means for admitting compressed air to the drums 83 to control admission of water into the same and to force water therefrom, will be hereinafter described.

As stated, one of the purposes of the invention is to provide means to guide the fore end of the apparatus from the surface of the water down toward the sunken vessel. This means, in the present instance of the invention, comprises a guide column 85 (Figs. 1 and 6) preferably of tubular construction having a closed upper end and a lower end communicating with a transverse tube 87 having a series of kedge anchors 89 projecting downward therefrom. To tend to maintain the guide column in position with the guideway uppermost, a weight conveniently in the form of a bar 90 may be mounted in brackets 90ª secured to the under side of the column, as will be noted in Fig. 1. Mounted on the top of the column 85 is a guideway 91 for a slide 93. Upward movement of the slide may be limited by a bolt 95 adjacent the upper end of the guideway 91. The lower end of the guideway is open, as will be noted in Fig. 6, so that the slide may escape therefrom in a manner more fully hereinafter described. Adjacent the lower end of the guide column 85 is a water port 97 provided with a valve 99 connected by a stem 101 with a hand wheel 103 set in a recess in the column. The valve 99 may be opened to admit water into the hollow column 85 and tube 87 to cause the lower end thereof to sink toward one end of the sunken vessel, where the kedge anchors 89 may embed themselves or grip the bottom of the ocean and prevent lateral movement of the guide column.

Suitable means may be provided to connect the slide 93 with the fore end of the apparatus, so that it may serve to guide the same down toward the sunken vessel. This means, in the present instance, comprises a cable 105 (Fig. 7) having one end connected to a ring 109 supported by cables 111 extending to and connected to eyes 113 at the fore ends of the pontoons. The cable 105 may pass around a pulley 115 (Fig. 3) mounted on the slide and thence through the ring 109 to a point of anchorage on one of the pontoons.

A vessel or raft 117 (Fig. 1) may attend the fore end of the apparatus, and may support the upper end of the guide column 85. The raft may comprise a pair of pontoons 119 connected at one end by an arch 121. The upper end of the guide column is adapted to project up under this arch between the pontoons, and may be supported by a cable 123 having one end connected to a windlass 125 on the raft, said cable projecting upward around a pulley 127 at the top of the arch, thence in the form of a loop 123ª around a slide 123ᵇ mounted in the guideway 91 of the guide column, and up around a pulley 129 at the top of the arch, and thence downward to a windlass 131. The construction is such that the cable 123 may be adjusted to shorten or lengthen the loop supporting the guide column, and thereby vary the angle thereof. This angle may be varied by varying the distance of the raft from the apparatus.

To position the column between the pontoons 119, a cable 124ª (Fig. 12) may be looped about a slide 124 mounted in the column guideway 91 and have its ends secured to one of the pontoons 119, and another cable 124ᵇ may be looped about said slide and have its ends secured to the other pontoon. The raft will, of course, be provided with suitable anchors for holding the same in the position required.

In use the guide column would be positioned substantially as shown in Fig. 1, with the slide 93 connected to the fore end of the apparatus by the cable 105. The slide 93 may be supported by a cable 133 passing over a pulley 135 mounted on the arch down to a windlass 137 on the raft. The guide column may be shifted laterally to the proper position by side cables 139 having their lower ends connected to eyes 141 on the tube 87 at the base of the guide column, and the upper ends of the side cables may be connected to windlasses 142 mounted on the raft. After the guide column has been properly positioned with its base adjacent one end of the sunken vessel, and the slide has been connected to the fore end of the apparatus described, water may be admitted to the fore end of the apparatus to cause the same to move downward toward the sunken vessel. In doing so, the slide 93 will move downward in the guideway 91 on the column, and guide the fore end of the apparatus toward the sunken vessel, so that the fore ends of the pontoons will rest on the bottom of the ocean adjacent one end of the sunken vessel and at opposite sides thereof. As the slide approaches the lower end of the guide column, it will escape from the guideway and not interfere with the rising of the apparatus after it has taken hold of the sunken vessel. The slide, however, will not be lost, since it will hang from and be supported by the cables 111 connected to the fore ends of the pontoons as described. When the slide is not in use, it may be pulled up out of the way by taking in the cable 105.

A raft or vessel 143 may be provided to attend the aft end of the apparatus. This raft should be held in its proper position to attend the aft end of the apparatus by suitable anchors. It is desirable that the raft 143 shall be connected to the aft end of the apparatus to control the same while the fore end of the apparatus is being guided by the guide column down toward the sunken vessel. To accomplish this, a cable 144 may have one end anchored to the raft, and a cable may be passed through a ring 144ª connected by cables 144ᵇ with the aft ends of the pontoons, the cable 144 being returned from the ring to a windlass mounted on the raft 143. One of the purposes of the invention is to provide pneumatic control devices for the apparatus mounted on the fore and aft attending raft or ships, and connected by pneumatic tubes with the apparatus. On the fore raft an air compressor 145 may be provided and supply compressed air through a pipe 147 to a control box 149 (Fig. 10), said pipe 147 being provided with a valve 151 to admit compressed air to or cut off the supply of compressed air from said box as desired. Pipes 153 and 155 lead from the box 149 to the fore compartments of the apparatus, and the supply of compressed air thereto is controlled by valves 157 and 159. Compressed air is conducted from the box 149 to the lightening compartments 81 of the pontoons by pipes 161 and 163 controlled by valves 165 and 167, said pipes 161 and 163 being led along the pontoons so as to communicate with the lightening compartments adjacent the aft ends thereof. The aft ends of the transverse stability drums 83 communicate with the lightening compartments through pipes 169, and the fore ends of said drums communicate with said compartments through pipes 171.

To admit compressed air to the pontoon rocking cylinder 7 at the fore end of the apparatus, a pipe 173 may be connected to the box and lead to said cylinder, and the supply of compressed air therethrough may be controlled by a valve 175.

In the operation of the pneumatic control instrumentalities it is necessary that compressed air should not only be supplied thereto, but that it should escape therefrom. The air may escape therefrom back to the control box 149 and escape from the box through a valve 177, it being understood that when air is escaping, the valve 151 in the supply pipe 147 is closed.

To supply compressed air to the cylinder 23 at the fore end of the apparatus for releasing the rack engaging dogs and locking bridges, the box 149 may be provided with a compartment 179 receiving compressed air from the supply pipe 147 through a branch pipe 181 under control of a valve 183. A pipe 185 leads from the box compartment 179 to the cylinder 23 at the fore end of the apparatus, and the supply of compressed air through the pipe is controlled by a valve 187. To permit air to escape from said cylinder back through the pipe 185 and from the box compartment 179, the latter may be provided with an escape valve 189.

Referring now to the raft or ship 143 attending the aft end of the apparatus, an air compressor 191 (Fig. 1) may be mounted thereon and supply compressed air to a control box 193 (Fig. 11) through a supply pipe 195 under the control of a valve 197.

To supply compressed air from the box 193 to the aft compartments of the pontoons, the box 193 may be connected by pipes 199 and 201 with said compartments, and the supply of compressed air through said pipes may be controlled by valves 203 and 205.

To supply compressed air to the cylinders for moving the jaws inward to conform to the contour of the hull of the sunken vessel, pipes 207 and 209 may lead from the box 193 to the main supply pipes 49 referred to, for said cylinders, and the supply of compressed air thereto may be controlled by valves 211 and 213.

To supply compressed air to the pontoon rocking cylinder 7 at the aft end of the apparatus, a pipe 215 may lead from the control box 193 to said cylinder, and the supply of compressed air through said pipe may be controlled by a valve 217.

The box 193 may be provided with an air escape valve 219, it being understood that the valve 197 in the compressed air supply pipe 195 is closed when the escape valve 219 is opened.

To supply compressed air to the cylinder 23 at the aft end of the apparatus for releasing the rack dogs and locking bridges at said end, the box 193 may be provided with a compartment 221 connected by the pipe 223 with said cylinder, and the supply of compressed air through the pipe 223 may be controlled by a valve 225. Compressed air may be supplied to the box compartment 221 through a branch pipe 227 under the control of a valve 229. The box compartment 221 may be provided with an air escape valve 231.

To supply compressed air to the guide column for the fore end of the apparatus, the control box 149 may be provided with a pipe 231 (Fig. 10) leading therefrom to the upper end of said column, and the supply of air through said pipe may be controlled by a valve 233.

The compressed air supply pipes leading from the control boxes 149 and 193 may be arranged in groups and may be detachably connected by couplings 235 (see Fig. 5) to continuations of said pipes mounted on circular platforms 237 encircling the pontoon rocking cylinders 7. Thus, the pipes may be connected to the apparatus at points sufficiently high to avoid interference with the operation of the apparatus.

To admit water to the fore compartments 77 of the pontoons (see Fig. 9), water ports 138 may be provided in the bottoms thereof adjacent the fore ends of said compartments; to admit water to the aft compartments 79 of the pontoons, the bottoms thereof may be provided with ports 146 adjacent the fore ends of said compartments; and to admit water to the lightening compartments 81 thereof, the bottoms thereof may be provided with water ports 148 adjacent the fore ends thereof. Each of these ports may be provided with a valve connected by a stem with a handle accessible at the upper sides of the pontoons, the construction being substantially the same as that shown in Fig. 8 for controlling the admission of water to the guide column.

When it is desired to employ the apparatus to raise a sunken vessel, the apparatus, the fore and aft attending rafts and the guide column may be towed to the location of the sunken vessel. Then the compressed air conducting pipes may be connected to the pipe couplings 235 mounted on the platforms encircling the pontoon rocking cylinders. The cable 144 may be connected to the aft end of the apparatus as described. The guide column may be introduced through the arch of the fore raft and between the pontoons thereof and connected thereto by the cable 123. The side cables 139 connected to the base tube 87 of the column may be connected to windlasses on the raft, and the slide 93 connected to the cable 105 attached to the fore end of the apparatus may be introduced into the guideway 91 of the column, the bolt 95 being first removed to admit the slide into said guideway. The upper end of the column may be coupled to the compressed air pipe 231 leading to the fore control box 149, and then the water admission valve 99 at the lower end of the guide column may be opened to admit water to the guide column to cause the lower end thereof to sink toward the bottom of the ocean. The valve 233 for the pipe 231 may be opened to admit compressed air into the guide column to interrupt the lowering movement of the guide column and maintain the same in a position out of engagement with the bottom, so that the side cables 139 may be operated to swing the guide column laterally to the position required. Then the air supply pipe valve 151 for the box may be closed and the air escape valve 177 for the box may be opened to allow the air to escape from the column and permit the lower end of the guide tube to sink to the bottom of the ocean. The kedge anchors 89 at the lower end of the guide tube will embed themselves in the bottom and obtain a grip thereon to prevent lateral movement of the guide column.

The apparatus is now on the surface of the water above the sunken vessel, and the pontoons are in their closed position where they are held by the dogs 13 engaging the racks 11 and held by the locking bridges 15. The pontoons should be in their open position before moving down to the sunken vessel. It is desirable to apply pressure to the pontoon rocking cylinders to urge the pontoons toward each other somewhat, in order to release the pressure on the locking dogs 13 and locking bridges 15. To accomplish this, the valves 175 and 217 of the fore and aft control boxes are opened, and the escape valves 177 and 219 are closed, thereby admitting compressed air to the pontoon rocking cylinders 7. Then the valves 183 and 229 for the fore and aft box compartments 179 and 221 are opened to admit compressed air thereto. The escape valves 189 and 231 are closed, and the valves 187 and 225 are opened to admit compressed air through the pipes 185 and 223 to the cylinders 21 at the fore and aft ends of the apparatus. This will move the pistons 23 of said cylinders upward, thereby pulling the chains 29 and 33 upward to rock the dogs 13 away from the racks 11, and rock the locking bridges upwardly to allow the pins 19 to escape from the locking portions of the slots 17. Then the valves 151 and 197 for supplying compressed air to the control boxes 149 and 193 are closed, and the escape valves 177 and 219 are gradually opened, thereby permitting the compressed air to gradually escape from the pontoon rocking cylinders 7. Then the pontoons will no longer be held in closed position, and will be free to gradually open or rock outwardly under the influence of gravity. The release of the compressed air from the control boxes in allowing the pontoons to open, will not release the compressed air from the cylinders for holding the locking dogs away from the racks, since the latter cylinders are controlled by compressed air admitted to the compartments 179 and 221 which are separate from the main portions of said boxes. After the pontoons have fully opened, the air supply valves 183 and 229 may be closed, and the escape valves 189 and 231 of the box compartments may be opened to allow air to escape from the dog controlling cylinders, and permit the dogs to re-engage with the racks 11.

The apparatus with the pontoons in open position is now in readiness to move down toward the sunken vessel. To accomplish this, water is first admitted to the fore compartments of the pontoons, to the transverse stabilizing drums, and to the lightening compartments. To effect this operation, the escape valves 177 and 219 of the fore and aft control boxes are opened, the control valves 165 and 167 for the lightening compartments are opened, and the control valves 157 and 159 for the fore compartments of the pontoons are opened. This will allow air to escape from said lightening compartments, drums and fore compartments, and water to enter the same through the water ports. This will cause the fore end of the apparatus to lower toward the sunken vessel, and in the course of its transit it will be guided by the slide in the guide column so as to bring the fore ends of the pontoons adjacent one end of the sunken vessel and at opposite sides thereof. As the fore end of the apparatus approaches this position, the slide will escape from the guideway of the guide column.

The aft end of the apparatus should now be lowered to the sunken vessel. To accomplish this, the cable 144 connecting the aft end of the apparatus with the raft attending the aft end of the apparatus, is released from the apparatus. Then the valves 203 and 205 for the pipes 199 and 209 leading from the aft control box 193 to the aft compartments of the pontoons are opened, thereby allowing air to escape from said compartments, and water to enter the same through the water ports therefor. This will cause the apparatus to rock downward toward the bottom of the ocean so as to bring the pontoons at opposite sides of the sunken vessel. The apparatus is now in a horizontal position, and the jaws thereof are resting on the bottom of the ocean.

To lighten the apparatus and prevent the jaws from digging too deep into the ocean bottom, the water should now be forced from the lightening compartments. To accomplish this, the air escape valves 177 and 219 for the fore and aft control boxes are closed, and the compressed air admission valves 151 and 197 are opened, and the valves 165 and 167 are opened, thereby admitting compressed air through the pipes 161 and 163 to the lightening compartments. The compressed air thus admitted will pass along from the aft end of the apparatus toward the fore end of the apparatus and through the pipes 169 to the upper parts of the transverse stabilizing drums. This will force the water from the lightening compartments and drums out through the water ports 148. The water will pass from said drums to the lightening compartments through the pipes 171. This will not only lighten the apparatus as a whole and tend to prevent the jaws from digging too deeply into the ocean bottom, but also will increase the transverse stability of the apparatus and assist rocking of the pontoons toward each other by throwing the center of gravity of the pontoons outward, due to the absence of water in the lightening compartments, and the presence of water in the fore and aft compartments of the pontoons.

The pontoons are now at opposite sides of the hull of the sunken vessel, and at a distance apart substantially greater than the beam of the sunken vessel. To move the pontoons toward each other to positions adjacent the opposite sides of the hull of the sunken vessel, the valves 175 and 217 are opened, thereby admitting compressed air through the pipes 173 and 215 to the pontoon rocking cylinders 7. This will buckle the links 5 and rock the pontoons from their positions shown in Fig. 2 to their positions shown in Fig. 3. When the pontoons have been thus moved, the dogs 13 will automatically engage the racks 11, and the locking bridges 15 will interlock with the pins 19 to hold the pontoons in their closed positions. This may be assisted by closing the valves 175 and 217 to confine the compressed air in the pontoon rocking cylinder 7, and the presence of this compressed air in said cylinders will tend to prevent any slight rocking of the pontoons, or lost motion thereof.

Next it is desirable to rock the pontoon jaws inward to conform to the contour of the hull of the sunken vessel. To accomplish this, the valves 211 and 213 are opened, thereby admitting compressed air through the pipes 207 and 209 to the main pipes 49, and thence through the branch pipes 51 to the jaw operating cylinders 45. This will cause the pistons 43 in said cylinders to move upward and thrust the yokes 39 upward. The latter in turn will operate through the cables 37 to draw the jaws 35 toward the hull of the sunken vessel, and the jaws will be automatically, differentially moved to conform to the contour of the sunken vessel, and thus all or substantially all of the jaws will engage the hull of the sunken vessel and share in the work of supporting the same. The yokes 39 will be automatically held in their positions of adjustment by engagement of the dogs 55 thereon with the rack 57 on the shoes 47, and holding of the yokes will be assisted by closing the valves 211 and 213 to confine the compressed air in the cylinders 45.

The apparatus preferably is moved upward obliquely with the sunken vessel. To accomplish this, the water is first forced from the aft compartments. This operation is effected by opening the valves 203 and 205, thereby admitting compressed air through the pipes 199 and 209 to the aft compartments, which thus rendered buoyant, will move upward toward the surface of the water.

Next the fore end of the apparatus should be raised. To accomplish this, valves 157 and 159 are opened, thereby admitting compressed air through the pipes 153 and 155 to the fore compartments of the apparatus. This will force the water therefrom and cause the same to rise to the surface of the water.

The apparatus and the sunken vessel carried thereby are now at the surface of the water, and sufficient repairs may be made on the sunken vessel and water forced therefrom to enable the same to float independently of the apparatus. Then it is desirable to liberate the vessel from the apparatus. To accomplish this, water may be admitted to the fore compartments of the pontoons to allow the fore ends of the apparatus to sink sufficiently to enable the vessel to float free from the apparatus.

It will be understood that the invention is not limited to the specific embodiment shown, and that various deviations may be made therefrom, without departing from the spirit and scope of the appended claims.

What is claimed is:—

1. An apparatus for raising sunken vessels, comprising, in combination, pontoons, means to hold said pontoons in fixed spaced relation, that they may move as a unit down to opposite sides of a sunken vessel, means to move the pontoons in a direction of approach toward opposed sides of the sunken vessel, series of jaws mounted on said pontoons, and means differentially to move said jaws relatively to said pontoons to cause said jaws to engage and conform to the contour of the hull of the sunken vessel.

2. An apparatus for raising sunken vessels, comprising, in combination, pontoons, means to hold said pontoons in fixed spaced relation, that they may move as a unit down to opposite sides of the sunken vessel, means to move the pontoons in a direction of approach toward the opposed sides of the sunken vessel, series of members carried by said pontoons, and fluid pressure means differentially to move said members toward and in conforming engagement with the hull of the sunken vessel.

3. An apparatus for raising sunken vessels, comprising, in combination, pontoons, means to hold said pontoons in fixed spaced relation that they may move as a unit down to opposite sides of the sunken vessel, means to move the pontoons in a direction of approach toward sides of the sunken vessel, series of arms pivotally connected to said pontoons, and means differentially to move said arms toward and into conforming engagement with the hull of the sunken vessel after the pontoons have been moved toward the sides of the sunken vessel.

4. An apparatus for raising sunken vessels, comprising, in combination, pontoons, means connecting said pontoons adjacent the fore and aft ends thereof having provision for relatively moving the pontoons in a direction of approach toward the opposite sides of a sunken vessel, the connecting means for the pontoons being spaced fore and aft a sufficient distance to admit the hull of the sunken vessel between them, a series of hull engaging members carried by the pontoons, and means differentially to move said members toward and into conforming engagement with the hull of the sunken vessel.

5. An apparatus for raising sunken vessels, comprising, in combination, pontoons, means to hold said pontoons in fixed spaced relation that they may move as a unit down to opposite sides of a sunken vessel, means to move the pontoons in a direction of approach toward the sides of the sunken vessel, a series of arms carried by the pontoons, means differentially to adjust said arms toward and into conforming engagement with the hull of the sunken vessel, and means positively to hold the arms in their positions of adjustment.

6. An apparatus for raising sunken vessels, comprising, in combination, pontoons of sufficient size and capacity to raise a sunken vessel, means connecting said pontoons having provision to hold the same in fixed spaced relation while moving down to opposite sides of a sunken vessel, means to admit water into said pontoons to sink the same, means to force air into the pontoons to drive the water therefrom and elevate the same, means relatively to move the pontoons in a direction of approach toward opposed sides of the sunken vessel, series of hull engaging members carried by the pontoons and distributed at intervals along the length thereof, and means differentially to move said members into conforming engagement with the hull of the sunken vessel.

7. An apparatus for raising sunken vessels, comprising, in combination, connected pontoons movable as a unit to positions at opposite sides of the hull of a sunken vessel, series of members connected to said pontoons, cylinders for the respective members mounted on said pontoons, pistons in said cylinders, connections from said pistons to said members, means to admit fluid pressure to said cylinders to move said pistons therein differentially and adjust said members toward and to conform with the hull of the sunken vessel, and means to prevent reverse movement of said members after adjustment toward the hull of the sunken vessel.

8. An apparatus for raising sunken vessels, comprising, in combination, connected pontoons movable as a unit to positions at opposite sides of the hull of a sunken vessel, series of members connected to said pontoons, means for moving said members toward the hull of the sunken vessel, and means automatically to lock said members positively against movement away from the hull of the sunken vessel.

9. An apparatus for raising sunken vessels, comprising, in combination, connected pontoons movable as a unit to positions at opposite sides of the hull of a sunken vessel, series of members connected to said pontoons, cylinders for the respective members, pistons therein connected to said members, and main pipes and branch pipes for conducting fluid to said cylinders to move said pistons therein and adjust said members differentially toward the hull.

10. An apparatus for raising sunken vessels, comprising, in combination, connected pontoons movable as a unit to positions at opposite sides of the hull of a sunken vessel, means relatively to move the pontoons in a direction of approach toward opposed sides of the sunken vessel, series of members connected to said pontoons, means to move said members relatively to said pontoons toward the hull, and means to limit such movement of said members.

11. An apparatus for raising sunken vessels, comprising, in combination, connected pontoons movable as a unit to positions at opposite sides of the hull of a sunken vessel, series of members connected to said pontoons, cylinders, pistons therein, means connecting said pistons with said members, means to admit fluid to said cylinders to cause said pistons and connections to move the members, racks adjacent said cylinders and dogs connected to said pistons for engagement with said racks to prevent movement of said members away from the hull.

12. An apparatus for raising sunken vessels, comprising, in combination, connected pontoons movable as a unit to positions at opposite sides of the hull of a sunken vessel, means relatively to move the pontoons in a direction of approach toward opposed sides of the sunken vessel, series of members connected to said pontoons, fluid pressure devices mounted on the pontoons and connected to said members, and means for conducting fluid from a vessel attending the apparatus to said devices to move said members toward the hull.

13. An apparatus for raising sunken vessels, comprising, in combination, connected pontoons movable as a unit to positions at opposite sides of the hull of a sunken vessel, series of members connected to said pontoons to engage the sunken vessel, means relatively to move said pontoons in a direction of approach toward opposite sides of the hull of the sunken vessel, and series of buffers disposed at intervals along said pontoons to protect the latter from the hull.

14. An apparatus for raising sunken vessels, comprising, in combination, connected pontoons movable as a unit to positions at opposite sides of the hull of a sunken vessel, series of hull-engaging members connected to said pontoons, and series of yieldable bow buffers disposed at intervals along the pontoons to protect the latter from the hull.

15. An apparatus for raising sunken vessels, comprising, in combination, connected pontoons movable as a unit to positions at opposite sides of the hull of a sunken vessel, series of hull-engaging members connected to said pontoons, and skids on the pontoons to protect the same from injurious engagement with the bottom of the ocean.

16. An apparatus for raising sunken vessels, comprising, in combination, pontoons connected and movable to positions at opposite sides of the hull of a sunken vessel, series of jaws mounted on the pontoons for engagement with the hull, said pontoons having side compartments extending longitudinally thereof adjacent the inner sides of the pontoons, and means to drive water from said compartments to lighten the apparatus and reduce the pressure of the jaws on the bottom of the ocean.

17. An apparatus for raising sunken vessels, comprising, in combination, pontoons connected and movable to positions at opposite sides of the hull of the sunken vessel, series of jaws mounted on said pontoons for engagement with the hull, said pontoons having side compartments disposed therein adapted to have water driven therefrom to lighten the apparatus and assist movement of the jaws toward the hull.

18. An apparatus for raising sunken vessels, comprising, in combination, pontoons connected and movable to positions at opposite sides of the hull of the sunken vessel, means to adjust said pontoons toward the hull, telescoping members connecting the pontoons adjacent the ends thereof, and buffers carried by said telescoping members to limit movement of the hull fore and aft of the apparatus and thereby protect the apparatus from the hull.

19. An apparatus for raising sunken vessels, comprising, in combination, pontoons connected and movable toward each other to positions at opposite sides of the hull of the sunken vessel, and buffer means connected to the pontoons adjacent the ends of the apparatus to limit fore and aft movement of the hull and having provision to allow movement of the pontoons toward and from each other.

20. An apparatus for raising sunken vessels, comprising, in combination, pontoons connected and movable toward each other to positions at opposite sides of the hull of the sunken vessel, and means bridging said pontoons automatically to lock said pontoons against relative movement after adjustment of the pontoons toward the hull.

21. An apparatus for raising sunken vessels, comprising, in combination, pontoons connected and movable toward each other to positions at opposite sides of the hull of the sunken vessel, means controllable above the surface of the water for so moving the pontoons, and means bridging the pontoons for automatically locking the same against relative movement after adjustment thereof toward the hull.

22. An apparatus for raising sunken vessels, comprising, in combination, pontoons connected and movable to positions at opposite sides of the hull of a sunken vessel, bridge members connected to the pontoons having provision for automatically locking the same against relative movement after adjustment toward the hull, and means for unlocking said bridge members to allow movement of the pontoons away from each other.

23. An apparatus for raising sunken vessels, comprising, in combination, pontoons, means connecting said pontoons, pistons and cylinders operating through said connecting means to move said pontoons toward each other to positions at opposite sides of the hull of a sunken vessel, racks associated with said pistons, dogs co-operating with said racks automatically to lock the pontoons against outward movement, and fluid pressure means for releasing said dogs from said racks to allow movement of the pontoons away from each other.

24. An apparatus for raising sunken vessels, comprising, in combination, pontoons, means connecting said pontoons that they may move as a unit to opposite sides of the hull of a sunken vessel, means to move said pontoons toward the hull, means including racks and dogs for locking said pontoons against outward movement, members bridging said pontoons automatically to lock the same against relative movement after adjustment toward the hull, and fluid pressure means for releasing said dogs and locking members to allow movement of the pontoons away from each other.

25. An apparatus for raising sunken vessels, comprising, in combination, pontoons, means connecting said pontoons that they may move as a unit to opposite sides of the hull of a sunken vessel, means to move said pontoons toward the hull, means including racks and dogs for locking said pontoons against outward movement, members bridging said pontoons automatically to lock the same against relative movement after adjustment toward the hull, cylinders, pistons therein, and connections from said pistons to said dogs and locking members for releasing the same in response to movement of said pistons in said cylinders.

26. An apparatus for raising sunken vessels, comprising, in combination, pontoons connected and movable toward each other to positions at opposite sides of the hull of a sunken vessel, series of members connected to said pontoons for engagement with the hull, and drums mounted on the pontoons adapted to have water driven therefrom to contribute to lateral stability of the apparatus in moving upward toward the surface of the water.

27. An apparatus for raising sunken vessels, comprising, in combination, pontoons connected and movable to positions at opposite sides of the hull of a sunken vessel, compartments mounted on and above said pontoons, and means to force water from said compartments before forcing water from said pontoons to contribute to the lateral stability of the apparatus in rising from the bottom of the ocean.

28. An apparatus for raising sunken vessels, comprising, in combination, pontoons connected and movable to positions at opposite sides of the hull of the sunken vessel, a guide column adapted to be supported in an inclined position with its lower end anchored to the bottom of the ocean, a slide on said column, and means connecting said slide with one end of the apparatus to guide such end downward toward the hull of the sunken vessel.

29. An apparatus for raising sunken vessels, comprising, in combination, pontoons connected and movable as a unit to positions at opposite sides of the hull of a sunken vessel, a guide column having means at the lower end thereof for anchorage on the bottom of the ocean, said column having a guideway thereon, a slide movable along said guideway, and means connecting said slide with one end of the apparatus to guide the same toward the sunken vessel.

30. An apparatus for raising sunken vessels, comprising, in combination, connected pontoons movable as a unit to positions at opposite sides of the hull of a sunken vessel, means to cause one end of the apparatus to move toward the sunken vessel before the other end thereof, and a guide column for anchorage adjacent one end of the sunken vessel and connected to the apparatus to guide the advancing end of the apparatus toward the sunken vessel.

31. An apparatus for raising sunken vessels, comprising, in combination, pontoons connected and movable as a unit to positions at opposite sides of the hull of a sunken vessel, a guide column having means at the lower end thereof for anchorage at the bottom of the ocean adjacent one end of the sunken vessel, means to support the upper end of said column, a slide movable along said column, and means to connect said slide with one end of the apparatus to guide the same toward the sunken vessel in advance of the opposite end of the apparatus.

32. An apparatus for raising sunken vessels, comprising, in combination, pontoons connected and movable as a unit to positions at opposite sides of the hull of a sunken vessel, a guide column, means to support one end of the column at the surface of the water, means to admit water into said column to lower the opposite end thereof to the bottom of the ocean, and means movable along said column for connection with the apparatus to guide one end of the latter toward the sunken vessel in advance of the opposite end thereof.

33. An apparatus for raising sunken vessels, comprising, in combination, pontoons connected and movable as a unit to positions at opposite sides of the hull of a sunken vessel, a vessel to accompany the apparatus, a guide column adapted to project downward from the accompanying vessel to the bottom of the ocean adjacent the sunken vessel, a slide movable along said column, means to connect said slide with one end of the apparatus to guide the same from the water surface to the sunken vessel, and means connected to the column and accompanying vessel laterally to adjust the lower end of the column to the desired position.

34. An apparatus for raising sunken vessels, comprising, in combination, pontoons connected and movable as a unit to positions at opposite sides of the hull of a sunken vessel, a vessel to accompany the apparatus, a guide column adapted to project downward from the accompanying vessel to the bottom of the ocean adjacent the sunken vessel, a slide movable along said column, means to connect said slide with one end of the apparatus to guide the same from the water surface to the sunken vessel, and cables connected to the column and extending to the accompanying vessel for laterally adjusting the lower end of the column to the desired position.

35. An apparatus for raising sunken vessels, comprising, in combination, pontoons connected and movable as a unit to positions at opposite sides of the sunken vessel, a vessel to accompany the apparatus, a support mounted on the vessel, a guide column adapted to project downward from the accompanying vessel to a point adjacent the sunken vessel, a slide movable along said column, means to connect said slide with one end of the apparatus to guide the same downward to the sunken vessel, and means connecting said column with said support having provision to permit swinging movements of said column to bring the same to a point adjacent the sunken vessel.

36. An apparatus for raising sunken vessels, comprising, in combination, pontoons connected and movable as a unit to positions at opposite sides of the hull of a sunken vessel, a guide column having a lower end for anchorage on the bottom of the ocean, a guideway extending along said column and opening at the lower end thereof, a slide mounted in said guideway, and means to connect said slide with the apparatus to guide one end thereof down toward the sunken vessel, said slide being adapted to escape from the lower end of said guideway to allow the apparatus to rise independently of said column.

37. An apparatus for raising sunken vessels, comprising, in combination, pontoons, means to hold said pontoons in fixed spaced relation that they may move as a unit to opposite sides of the sunken vessel, fore and aft vessels attending the apparatus, air compressors mounted on said vessels, fluid pressure control boxes mounted on said vessels, pipes connecting said compressors with said control boxes, pipes connecting said control boxes with said pontoons, and valve means for said control boxes for controlling the admission of compressed air to said pontoons, and the escape thereof.

38. An apparatus for raising sunken vessels, comprising, in combination, pontoons, means connecting said pontoons to hold the same in fixed spaced relation that they may move as a unit to opposite sides of the hull of a sunken vessel, said pontoons being divided into forward and after compartments, fore and aft vessels attending the apparatus, compressors mounted on said vessels, control boxes mounted on said vessels, pipes connecting the compressors with the control boxes, pipes connecting the fore control box with the forward compartments, pipes connecting the aft control box with the after compartments, and valve means for controlling the admission of compressed air to said compartments and the escape thereof.

39. An apparatus for raising sunken vessels, comprising, in combination, pontoons connected and movable to positions at opposite sides of the hull of a sunken vessel, a series of jaws connected to said pontoons for engagement with the hull, said pontoons having forward longitudinal and after compartments and side compartments therein, fore and aft vessels attending the apparatus, air compressors and control boxes mounted on said vessels, means to admit compressed air from said compressors to said control boxes, pipes connecting one of the control boxes with the side compartments, pipes connecting the control boxes with said forward and aft compartments, and valve means for controlling admission of compressed air through said pipes to said compartments and the escape thereof.

40. An apparatus for raising sunken vessels, comprising, in combination, pontoons connected and movable as a unit to positions at opposite sides of the sunken vessel, series of jaws mounted on said pontoons for engagement with the hull, fluid pressure operated devices adjacent the fore and aft ends of the apparatus for moving the pontoons in a direction of approach toward the hull, said pontoons having forward and after compartments therein, fore and aft vessels attending the apparatus, air compressors mounted on said vessels, control boxes mounted on said vessels, means to admit compressed air from said air compressors to said control boxes, pipes leading from said control boxes to the fluid pressure operated devices, for moving the pontoons toward the hull, pipes leading from the fore control box to the forward compartments of the apparatus, pipes leading from the aft box to the after compartments of the apparatus, valve means for controlling the admission of compressed air to said pontoon moving devices, and escape of air therefrom, and valve means for controlling admission of compressed air to said forward and after compartments and escape thereof.

41. An apparatus for raising sunken vessels, comprising, in combination, pontoons connected and movable as a unit to opposite sides of the hull of a sunken vessel, said pontoons having forward and after compartments, fluid pressure operated devices adjacent fore and aft ends of the apparatus for moving the pontoons toward the hull, means to lock the pontoons against movement outward from the hull, fluid pressure operated means to release said locking means, fore and aft vessels attending the apparatus, air compressors mounted on said vessels, control boxes mounted on said vessels, means to admit compressed air from the compressors to said control boxes, pipes leading from the fore control box to the forward compartments of the pontoons, pipes leading from the aft control box to the after compartments of the pontoons, pipes leading from said control boxes to the fluid pressure operated devices for moving the pontoons toward the hull, pipes leading from the control boxes to the fluid pressure operated devices for unlocking the pontoons, and valve means for controlling the passage of compressed air through said pipes.

42. An apparatus for raising sunken vessels, comprising, in combination, pontoons connected and movable as a unit to positions at opposite sides of the hull of a sunken vessel, series of jaws connected to said pontoons, fluid pressure operated devices for moving said jaws into engagement with the hull, fluid pressure operated devices adjacent fore and aft ends of the apparatus for moving the pontoons toward the hull, vessels attending the apparatus, air compressors mounted on said vessels, air control boxes mounted on said vessels, means to admit compressed air from said compressors to said boxes, pipes leading from said control boxes to the devices for moving the jaws, pipes leading from said control boxes to the devices for moving the pontoons toward the hull, and valve means for controlling the passage of air through said pipes.

43. An apparatus for raising sunken vessels, comprising, in combination, pontoons connected and movable as a unit to opposite sides of the hull of a sunken vessel, a vessel attending the apparatus, a guide column adapted to extend from said vessel down to a point adjacent the sunken vessel, a slide movable along said column, means to connect said slide to the apparatus to guide one end of the latter in advance of the other down to the sunken vessel, an air compressor mounted on the vessel, an air control box receiving compressed air from the compressor, a pipe leading from said box to said column, and valve means to control passage of air through said pipe to and from said column.

44. An apparatus for raising sunken vessels, comprising, in combination, opposed pontoons for receiving the vessel between them, connections for said pontoons having an axis extending longitudinally of said pontoons that the latter may swing on said axis into position to support the vessel, and means to hold said pontoons in said position.

45. An apparatus for raising sunken vessels comprising, in combination, opposed pontoons for receiving a vessel between them, means pivotally connecting said pontoons having an axis extending longitudinally thereof, and means to swing said pontoons on said axis toward one another into position to support the vessel.

46. An apparatus for raising sunken vessels comprising, in combination, pontoons having members for receiving and supporting a vessel, and means relatively to rock said pontoons to move said members to positions for holding and releasing the vessel.

47. An apparatus for raising sunken vessels comprising, in combination, pontoons for receiving a vessel between them, members projecting from said pontoons for engagement with the hull of the vessel, and means to rock said pontoons to move said members to and from their hull engaging positions.

48. An apparatus for raising sunken vessels comprising, in combination, pontoons for receiving a vessel between them, series of supporting members projecting from said pontoons for engagement with the hull of the vessel, and means for relatively moving said pontoons together with their series of members to move the latter to and from their hull engaging positions.

49. An apparatus for raising sunken vessels comprising, in combination, connected pontoons for receiving a vessel between them, series of members projecting from said pontoons for engagement with the under side of the hull of the vessel to support the same, and means for spreading the pontoons and for moving them in a direction of approach that the pontoons may descend over the vessel to opposite sides of the hull and then be moved to bring the members into position to support the hull.

50. An apparatus for raising sunken vessels comprising, in combination, pontoons for receiving a vessel between them, members connected to and extending a substantial distance beneath said pontoons for projection into the material on which the vessel rests, and means for relatively moving said pontoons to cause said members to pass through said material beneath the vessel to engage and support the vessel.

51. An apparatus for raising sunken vessels comprising, in combination, pontoons for receiving a vessel between them, members connected to said pontoons constructed and arranged for projection into the material on which the vessel rests, and means for rocking said pontoons and members to move said members through said material beneath the vessel.

52. An apparatus for raising sunken vessels comprising, in combination, pontoons for receiving a vessel between them, opposed claws on and secured to said pontoons for projection into the material on which the vessel rests, and means to draw said opposed claws through the material beneath the vessel to support the latter as the pontoons approach the vessel.

53. An apparatus for raising sunken vessels comprising, in combination, pontoons for receiving a vessel between them, members pivotally connected to said pontoons for supporting the hull of the vessel, means to limit inward movement of said members, and means to hold said members against said limiting means.

54. An apparatus for raising sunken vessels comprising, in combination, pontoons for receiving a vessel between them, members pivotally connected to said pontoons for supporting the hull of the vessel, means to limit inward movement of said members, and means to draw said members toward said limiting means.

55. An apparatus for raising sunken vessels comprising, in combination, pontoons for receiving a vessel between them, members pivotally connected to said pontoons for supporting the hull of the vessel, and adjustable means for securing said members against outward rocking movement.

56. An apparatus for raising sunken vessels comprising, in combination, pontoons for receiving a vessel between them, members pivotally connected to said pontoons for supporting the hull of the vessel, means to rock said pontoons and members to move the latter inward into position beneath the hull of the vessel, and adjustable means for securing said members against outward movement relatively to said pontoons, that obstruction to one or more of said members may not prevent inward movement of the other members.

57. An apparatus for raising sunken vessels comprising, in combination, pontoons for receiving a vessel between them, means adjacent the ends of said pontoons pivotally connecting the same, and means for moving said pontoons toward or from one another to positions for holding and releasing the vessel.

58. An apparatus for raising sunken vessels comprising, in combination, pontoons for receiving a vessel between them, members rigid with said pontoons projecting inward toward one another, means pivotally connecting the inner ends of said members, links having outer ends pivotally connected to said members, means pivotally connecting the inner ends of said links, and means co-operating with the inner ends of said members and links for spreading the same and moving said pontoons toward one another.

59. An apparatus for raising sunken vessels, comprising, in combination, pontoons for receiving a vessel between them, members rigid with said pontoons projecting inward toward one another, means pivotally connecting the inner ends of said members, pivotally connected links, and means including a cylinder and its piston co-operating with said members and links to relatively move said pontoons.

60. An apparatus for raising sunken vessels comprising, in combination, pontoons adapted to be lowered to receive a vessel between them, means positively to hold said pontoons in spaced relation while lowering, and fluid pressure means co-operating with said holding means for moving said pontoons toward one another into position to support the vessel.

61. An apparatus for raising sunken vessels comprising, in combination, pontoons, submersible for receiving a sunken vessel between them, means positively to hold said pontoons in spaced relation while submerging, and means operable above the surface of the water for moving said pontoons toward the sides of the sunken vessel.

62. An apparatus for raising sunken vessels comprising, in combination, pontoons, submersible for receiving a sunken vessel between them, means positively to hold said pontoons in spaced relation while submerging, fluid pressure means for moving said pontoons toward the sides of the sunken vessel, and controlling means for said fluid pressure means operable above the surface of the water.

63. An apparatus for raising sunken vessels comprising, in combination, pontoons for receiving a sunken vessel between them, and means for relatively moving said pontoons for receiving and releasing the vessel, including a cylinder, a piston therein, and means connecting said cylinder and piston with said pontoons.

64. An apparatus for raising sunken vessels comprising, in combination, pontoons for receiving a sunken vessel between them, and means for relatively moving said pontoons in a direction of approach to receive the vessel, including pairs of pivotally connected members, and means to spread said members.

65. An apparatus for raising sunken vessels comprising, in combination, pontoons for receiving a sunken vessel between them, and means for relatively moving said pontoons in a direction of approach to receive the vessel, including pairs of pivotally connected members, means for spreading said members, and means automatically to hold said members in spread condition.

66. An apparatus for raising sunken vessels comprising, in combination, pontoons for receiving a sunken vessel between them, and means for relatively moving said pontoons in a direction of approach to receive the vessel, including pairs of pivotally connected members, a rack co-operating with said pairs of members, means for moving said rack in one direction to spread said members, and a dog co-operating with said rack to prevent movement thereof in the opposite direction.

67. An apparatus for raising sunken vessels comprising, in combination, pontoons for receiving a sunken vessel between them, and means for relatively moving said pontoons in a direction of approach to receive the vessel, including pairs of pivotally connected members, a rack co-operating with said pairs of members, means for moving said rack in one direction to spread said members, a dog co-operating with said rack, and means tending to press said dog against said rack.

68. An apparatus for raising sunken vessels comprising in combination, pontoons for receiving a sunken vessel between them, means positively to hold said pontoons in spaced relation while lowering toward said vessel, and fluid pressure means adjacent both ends of said pontoons for relatively moving said pontoons in a direction of approach to receive the vessel.

69. An apparatus for raising sunken vessels comprising in combination, pontoons for receiving a sunken vessel between them, means positively to hold said pontoons in spaced relation while lowering toward said vessel, fluid pressure means adjacent both ends of said pontoons for relatively moving said pontoons in a direction of approach to receive the vessel, and controlling means for said fluid pressure means operable above the surface of the water.

70. An apparatus for raising sunken vessels to the surface of the water, comprising grasping means provided with members having jaws for engaging the hull of the vessel, means for moving said members in a direction of approach to close said jaws, controlling means for said jaw closing means operable above the surface of the water, and means positively to hold said members in position to maintain said jaws in their closed position.

71. An apparatus for raising sunken vessels to the surface of the water, comprising grasping means provided with opposed members having jaws for engaging the hull of the vessel, means for causing said grasping means to sink or float at will, means for moving said members in a direction of approach to close said jaws toward the hull of the vessel, controlling means for said closing means operable above the surface of the water, connecting means extending from said controlling means to the closing means, and means automatically and positively to hold said jaws in closed position.

72. An apparatus for raising sunken vessels to the surface of the water comprising grasping means having relatively movable members provided with elements to engage the hull of the vessel at a series of points at each side thereof, means for causing said grasping means to sink or float at will, having controlling means above the surface of the water, and means for closing said relatively movable members toward the opposed sides of the vessel to cause said series of elements to engage the hull of the vessel, and having controlling means above the surface of the water.

73. An apparatus for raising sunken vessels to the surface of the water, comprising grasping means having relatively movable members for engaging the hull of the vessel, means positively connecting said members, means for lowering said members over the vessel to opposite sides of the hull thereof, means for bodily moving said members toward the opposed sides of said hull, and means to raise the grasping means and vessel to the surface of the water.

74. An apparatus for raising sunken vessels to the surface of the water, comprising, in combination, members for location at opposite sides of a sunken vessel, adjustable means connecting said members at a plurality of points and positively holding said members in spaced relation, means to operate said adjustable means to relatively move said members into position to support the vessel after the apparatus is lowered to the vessel, and means to elevate said members and the vessel therewith to the surface of the water.

75. An apparatus for raising sunken vessels to the surface of the water, comprising, in combination, pontoons and members permanently connecting the same forming a unitary structure having a space for receiving the hull of a sunken vessel and completely bounded by said pontoons and members, means to admit water into said pontoons to lower the structure over the sunken vessel, and means to eject water from said pontoons to raise the structure with the sunken vessel to the surface of the water.

76. An apparatus for raising sunken vessels to the surface of the water, comprising, in combination, members for location at opposite sides of a sunken vessel, means to prevent relative movement of said members while being lowered toward said vessel, and operating means for moving said members toward each other to a position for taking the vessel and having controlling means operable above the surface of the water.

77. An apparatus for raising sunken vessels to the surface of the water, comprising relatively movable pontoons for receiving a vessel between them, means for holding said pontoons in predetermined fixed relation when lowering toward the vessel, supporting means projecting from said pontoons for engagement with the hull of the vessel, means for moving said pontoons supporting means together to and from position to support the vessel, said pontoons being each divided into compartments, ports for independently admitting water to said compartments, and means for independently admitting compressed fluid to said compartments to force the water therefrom.

78. An apparatus for raising sunken vessels comprising pontoons for receiving a vessel between them, means positively to hold said pontoons in spaced relation, means relatively to adjust said pontoons to a position to hold the vessel, said pontoons being each divided into compartments, means permitting water to flow into and out of said compartments, and means for admitting compressed fluid to said compartments.

79. An apparatus for raising sunken vessels comprising, positively connected, relatively adjustable pontoons for receiving a vessel between them, said pontoons being each divided into a plurality of compartments, means to admit water to said compartments, and means for differentially admitting compressed fluid to said compartments to differentially force the water therefrom.

80. An apparatus for raising sunken vessels comprising positively connected, relatively adjustable pontoons for receiving a vessel between them, said pontoons being each divided into a plurality of compartments, and means progressively to submerge the compartments to incline the apparatus in a fore and aft direction.

81. An apparatus for raising sunken vessels, comprising positively connected, relatively adjustable pontoons for receiving the hull of a vessel between them, means carried by said pontoons for supporting the hull, and means for admitting water to portions of said pontoons at one end of the apparatus before the portions of the pontoons at the other end thereof, that the apparatus may lower obliquely toward the sunken vessel.

82. An apparatus for raising sunken vessels, comprising positively connected, relatively adjustable pontoons for receiving the hull of a vessel between them, means for progressively admitting water to the pontoons in a fore and aft direction to sink one end of the apparatus before the other, and means for progressively forcing the water from the pontoons in an opposite direction to raise one end of the apparatus before the other.

83. An apparatus for raising sunken vessels, comprising positively connected, relatively adjustable pontoons for receiving the hull of a vessel between them, means for admitting water into said pontoons to sink the same, and means to force the water equally or differentially from said pontoons at will including controlling means operable above the surface of the water.

84. An apparatus for raising sunken vessels, comprising positively connected, relatively adjustable pontoons for receiving the hull of a vessel between them, means for admitting water into said pontoons to sink the same, and means including valve means to force the water equally or differentially from said pontoons at will.

85. An apparatus for raising sunken vessels, comprising positively connected pontoons for receiving the hull of a vessel between them, and means for sinking the apparatus obliquely in a fore and aft direction to position portions of said pontoons at one end of the apparatus at opposite sides of the sunken vessel before so positioning the opposite end portions of the pontoons.

86. An apparatus for raising sunken vessels, comprising positively connected pontoons for receiving the hull of a vessel between them, means to sink or raise the apparatus obliquely in a fore and aft direction including means to admit water to one end of each pontoon, means to permit air to escape from the opposite end of each pontoon, and means to admit compressed fluid to the latter end to force the water from the pontoon through said water admission means.

87. An apparatus for raising sunken vessels, comprising positively connected pontoons for receiving the hull of a vessel between them, each of said pontoons being divided into compartments, and each of said compartments having means to admit water to one end thereof, means to permit air to escape from the opposite end thereof, and means to admit compressed fluid to the latter end to force the water from the compartment.

88. An apparatus for raising sunken vessels, comprising, pontoons for receiving the hull of a vessel between them, means to adjust said pontoons toward one another into position to support said hull, and means positively to hold said pontoons in said position against relative movement.

89. An apparatus for raising sunken vessels and other bodies, comprising means for taking hold of the sunken vessel or body, operating means for said taking means having controlling means operable above the surface of the water, means for moving said apparatus in a fore and aft oblique direction to the sunken vessel or body, and means for raising the apparatus with the vessel or body to the surface of the water having controlling means operable above the surface of the water.

90. An apparatus for raising sunken vessels and other bodies, comprising means for taking hold of the sunken vessel or body, operating means for said taking means, means for sinking the apparatus to the sunken vessel or body, and means operable above the surface of the water for controlling the fore and aft and transverse stability of the apparatus in its lowering and raising transit.

91. An apparatus for raising sunken vessels comprising positively connected, relatively movable pontoons for receiving a sunken vessel between them, water ports for allowing flow of water to and from said pontoons, air ports for admitting compressed air to said pontoons, and tubes connected to said air ports for extension from the apparatus to control-ships at the surface of the water.

92. An apparatus for raising sunken vessels comprising positively connected, relatively movable pontoons for receiving a sunken vessel between them, said pontoons being divided into compartments, water ports for said compartments, air ports for admitting compresed air to said compartments, and tubes connected to said air ports for extension from the apparatus to control-ships at the surface of the water.

93. An apparatus for raising sunken vessels comprising positively connected, relatively movable pontoons for receiving a sunken vessel between them, water ports for allowing flow of water to and from said pontoons, valve means for opening and closing said water ports, ports to admit compressed air into said pontoons, tubes for said air ports for extension to ships at the surface of the water, and valves in said tubes above the surface of the water for controlling the admission of compressed air to said pontoons.

94. An apparatus for raising sunken vessels comprising positively connected, relatively movable pontoons for receiving a sunken vessel between them, jaws on said pontoons for engagement with the hull of the vessel, means for relatively moving said jaws in a direction of approach to support said hull, pneumatic means for operating said jaw moving means including tubes for extension from the apparatus to points above the surface of the water, water ports for said pontoons, air admission ports for said pontoons, tubes for extension from said air transmission ports to points above the surface of the water, and valve means for controlling the admission of compressed air to said tubes.

95. An apparatus for raising sunken vessels, comprising, in combination, connected pontoons movable as a unit to positions at opposite sides of the hull of a sunken vessel, and a guide column for anchorage adjacent one end of the sunken vessel and connected to an end of the apparatus to guide the same toward the sunken vessel.

96. An apparatus for raising sunken vessels, comprising in combination, connected pontoons movable as a unit to positions at opposite sides of the hull of a sunken vessel, a guide column for anchorage adjacent one end of the sunken vessel, and means secured to the apparatus and slidably connected to the column for guiding an end of the apparatus toward the sunken vesel.

97. An apparatus for raising sunken vessels, comprising in combination, connected pontoons movable to positions at opposite sides of the hull of a sunken vessel, a hollow guide column for anchorage adjacent one end of the sunken vessel and constructed to be sunk by admitting water within the column and to be raised by ejecting water therefrom, and connections between the column and one end of the connected pontoons for guiding an end of the pontoons toward the sunken vessel.

98. An apparatus for raising sunken vessels comprising, connected pontoons movable to positions at opposite sides of the hull of a sunken vessel, a guide column having a closed chamber for floating the column when water is expelled from the chamber and permitting an end of the column to sink when water is admitted to the chamber, means at the lower end of the column for anchoring said end adjacent an end of the sunken vessel, and connections between the column and pontoons for guiding one end of the connected pontoons towards the sunken vessel.

In testimony whereof, I have signed my name to this specification.

JOHN A. DE VITO.